United States Patent [19]

Draper

[11] 4,099,256
[45] Jul. 4, 1978

[54] METHOD AND APPARATUS FOR ESTABLISHING, READING, AND RAPIDLY CLEARING A TRANSLATION TABLE MEMORY

[75] Inventor: Don Ray Draper, Lisle, Ill.

[73] Assignee: Bell Telephone Laboratories, Incorporated, Murray Hill, N.J.

[21] Appl. No.: 742,268

[22] Filed: Nov. 16, 1976

[51] Int. Cl.² .............................................. G11C 5/02
[52] U.S. Cl. ................................. 364/900; 365/230
[58] Field of Search ........................... 340/173 AM; 364/200 MS File, 900 MS File, 200, 900; 365/49, 230

[56] References Cited

U.S. PATENT DOCUMENTS

| | | | |
|---|---|---|---|
| 3,648,254 | 3/1972 | Beausoleil | 364/200 |
| 3,648,255 | 3/1972 | Beausoleil et al. | 364/200 |
| 3,701,984 | 10/1972 | Burns | 340/173 AM |
| 3,747,070 | 7/1973 | Huttenhoff | 364/900 |
| 3,766,534 | 10/1973 | Beausoleil et al. | 364/900 |
| 3,812,467 | 5/1974 | Batcher | 364/900 |
| 3,840,862 | 10/1974 | Ready | 364/200 |
| 3,902,163 | 8/1975 | Amdahl et al. | 364/200 |
| 3,938,100 | 2/1976 | Steiner | 364/200 |
| 3,967,251 | 6/1976 | Levine | 364/900 |

Primary Examiner—Gareth D. Shaw
Assistant Examiner—Michael Sachs
Attorney, Agent, or Firm—Peter Visserman; Richard C. Stevens

[57] ABSTRACT

A table translator circuit arrangement comprises a plurality of random access word organized memories, input circuitry, output circuitry, and control circuitry. The word locations of each memory are separated into control and data locations defined by corresponding ranges of memory access addresses. Each table entry comprises one or more access control bits and associated data. Each table address defines a control location in one memory of the plurality and data locations in additional memories of the plurality. An entry to be written into the table is provided to input rotate circuitry which is controlled by a portion of the table address which defines the location at which the entry is to be written. The input rotate circuitry delivers the access control bits of the entry to a memory in which a control location is accessed and delivers the associated data bits to additional memories in which data locations are accessed. When an entry is read from the table, the address corresponding to that entry is utilized to access the control and data locations containing the entry. An entry read from the table is provided to output rotate circuitry which is controlled by a portion of the table address which defines the location from which the entry is read. The output rotate circuitry reassociates the access control bits and the associated data bits to their original format. To rapidly clear the memory locations which can contain access control bits, all memory addresses which define control locations are sequentially accessed in parallel in all memories of the plurality. An address generator which defines the memory addresses at which control bits can be stored is stepped sequentially through those addresses and as each address is utilized, the control bits at those locations are cleared. Accordingly, a control location is simultaneously cleared in each of the memories of the plurality thereby dividing by the number of memories the time necessary to clear the table locations which can contain access control bits.

17 Claims, 5 Drawing Figures

| FIG. 2 |
| --- |
| FIG. 3 |

METHOD AND APPARATUS FOR ESTABLISHING, READING, AND RAPIDLY CLEARING A TRANSLATION TABLE MEMORY

FIELD OF THE INVENTION

This invention relates to an improved table translator circuit arrangement for accessing memories containing relocatable programs and data, and more particularly, to a circuit arrangement for a table translator which utilizes one or more access control bits per table entry.

BACKGROUND OF THE INVENTION

In practical data processing systems, the library of programs required for performance of the processes to be implemented is often quite large compared to the capacity of the processor's high speed main memory. The main memory capacity is limited by economical considerations since the cost of high speed random access memory is quite high in comparison to many types of sequential access mass memory, e.g., disks, tapes, etc. There is a continuing modification of the allocation of the main memory in the course of executing programs from the library. Accordingly, economical utilization of the main memory dictates dynamic relocation of main memory storage areas to the various programs that are required for execution. In a commonly used prior art arrangement, a table translator comprising one entry for each page of program or data stored in the main memory is maintained in an auxiliary random access memory. Each such entry in the table comprises one or more access control bits and associated data which comprises at least part of a main memory address. In this prior art arrangement, the control bit or bits and the associated data are stored in a word location of the auxiliary random access memory. When the table stored in the auxiliary memory is to be changed, each successive word in the memory must be altered. Most tables only require a small portion of the total capacity of the auxiliary memory since the memory is made sufficiently large to accommodate the largest tables allowable. Accordingly, it is theoretically possible to overwrite only those addresses which are required for the new table. However, since the associated program may generate erroneous table addresses, it is advisable to clear either all the control bits in the auxiliary memory or the entire memory before the new table is established. Unfortunately, to effect a change of the control bits alone or of the data alone in this prior art arrangement, it is necessary to address all auxiliary memory locations since the control bits are distributed over all auxiliary memory locations.

SUMMARY OF THE INVENTION

In accordance with the present invention a memory utilized to store a translation table comprises a plurality of relatively small, individually and simultaneously addressable memories which permits simultaneous clearing of a word location in each of the plurality of memories; and independent circuitry is provided to distribute the elements of a table entry, e.g., control bits and data bits, among the plurality of memories such that the control bits for all of the table entries are stored in a limited range of addresses in each of the plurality of memories while the data associated with those control bits is distributed in an ordered fashion among the remaining addresses of the memories. Furthermore, output circuitry is provided which reassociates control bits and data bits to their original format.

Advantageously, the time required to effectively clear the translation table memory is divided by the number of memories of the plurality by simultaneously clearing a word location which can contain control bits in each of the memories.

In one specific embodiment of my invention, rotate circuitry is utilized to distribute the elements of a table entry among the plurality of memories and to reassociate control bits and data bits for output purposes. Furthermore, table clearing is more rapidly performed by providing an address generator which comprises a counter circuit and a high frequency oscillator which serve to generate in sequence the addresses at which control bits can be located.

BRIEF DESCRIPTION OF THE DRAWING

The invention will be understood from the following detailed description when read with reference to the drawing in which.

DETAILED DESCRIPTION

Figure 1:
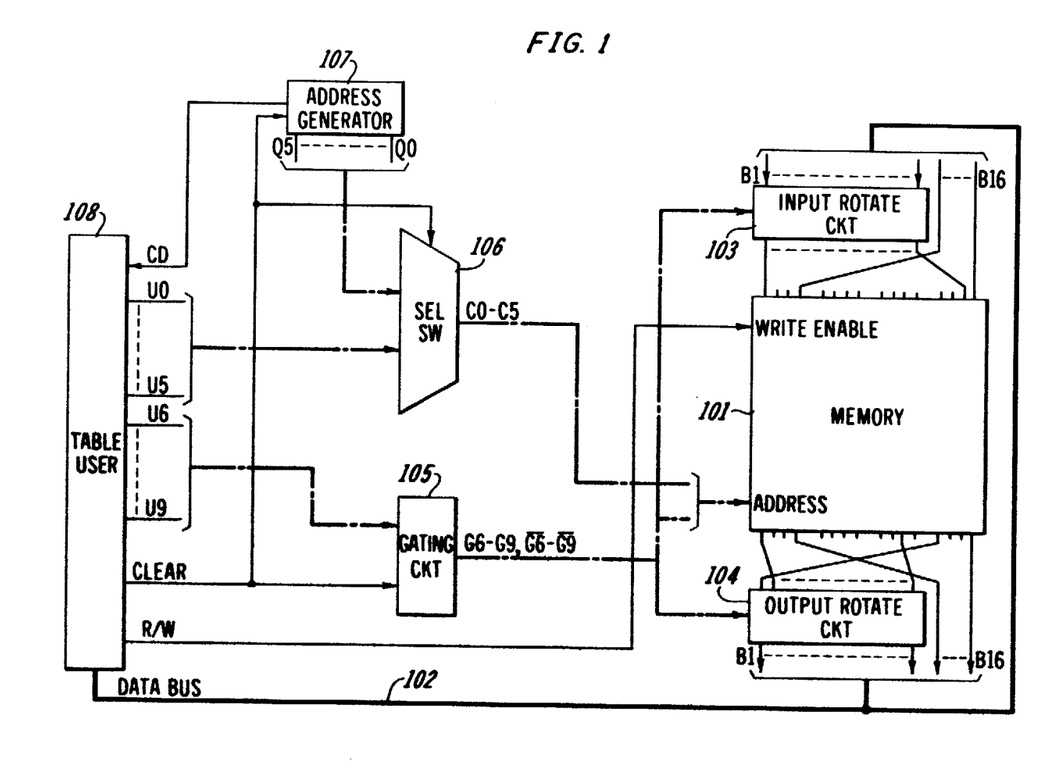
FIG. 1 is a block diagram of a table translator circuit arrangement in accordance with my invention.

An illustrative embodiment of a table translator circuit arrangement in accordance with my invention is shown in FIG. 1. This embodiment provides for establishing, reading, and rapidly clearing a translation table memory. The memory 101 is a random access word organized memory comprising 16 independent random access memories (RAM) each of which comprises 256 words with 4 bits per word. The RAMs are interconnected to provide 1K (1024) of 16-bit table entries, each of which comprises three access control bits and 13 associated data bits (see FIG. 2 and 3). The data bus 102 provides for the exchange of table entries between the table user 108 and the memory 101; the term table user is employed herein generally to designate the associated logic or processor circuitry which accesses and receives information from the memory 101. One-quarter of the locations within each RAM are allocated to contain access control bits and the remaining locations are allocated to contain data. The gating circuitry 105 together with the input rotate circuitry 103 accomplish this division of access control bits and data bits for writing table entries; and the gating circuitry 105 together with the output rotate circuitry 104 reassociate the access control bits and the data bits into the required format for the data bus 102 for reading table entries. The gating circuitry 105 further provides for simultaneously accessing control locations within all RAMs. Accordingly, locations which can contain access control bits can be rapidly cleared by simultaneously clearing an addressed location within all RAMs and sequentially addressing all locations which can contain access control bits by means of the address generator 107 and the selector switch 106.

Figure 2:
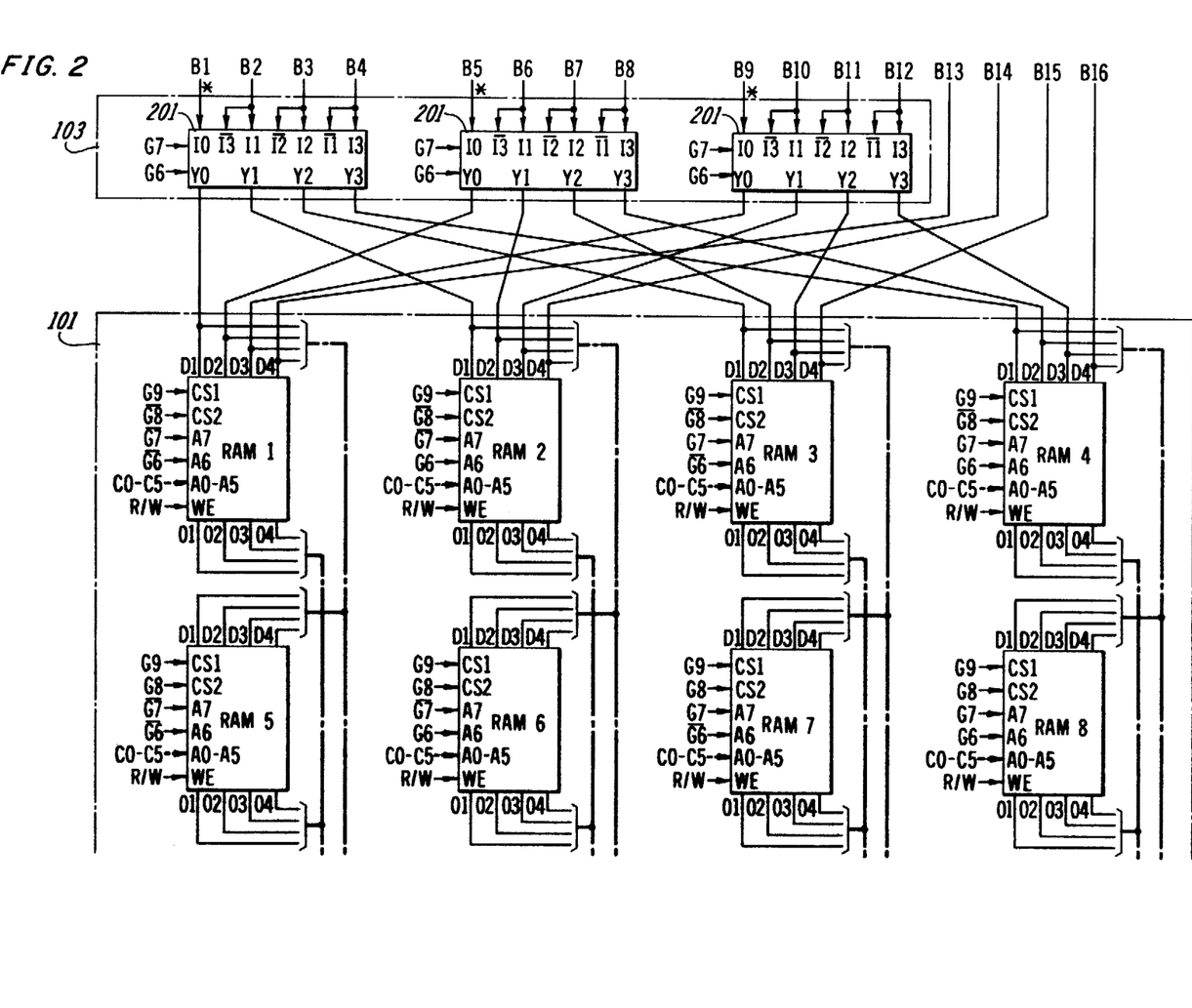
FIGS. 2 and 3 are a schematic diagram of the input rotate circuitry, the memory, and the output rotate circuitry of FIG. 1.
Figure 3:
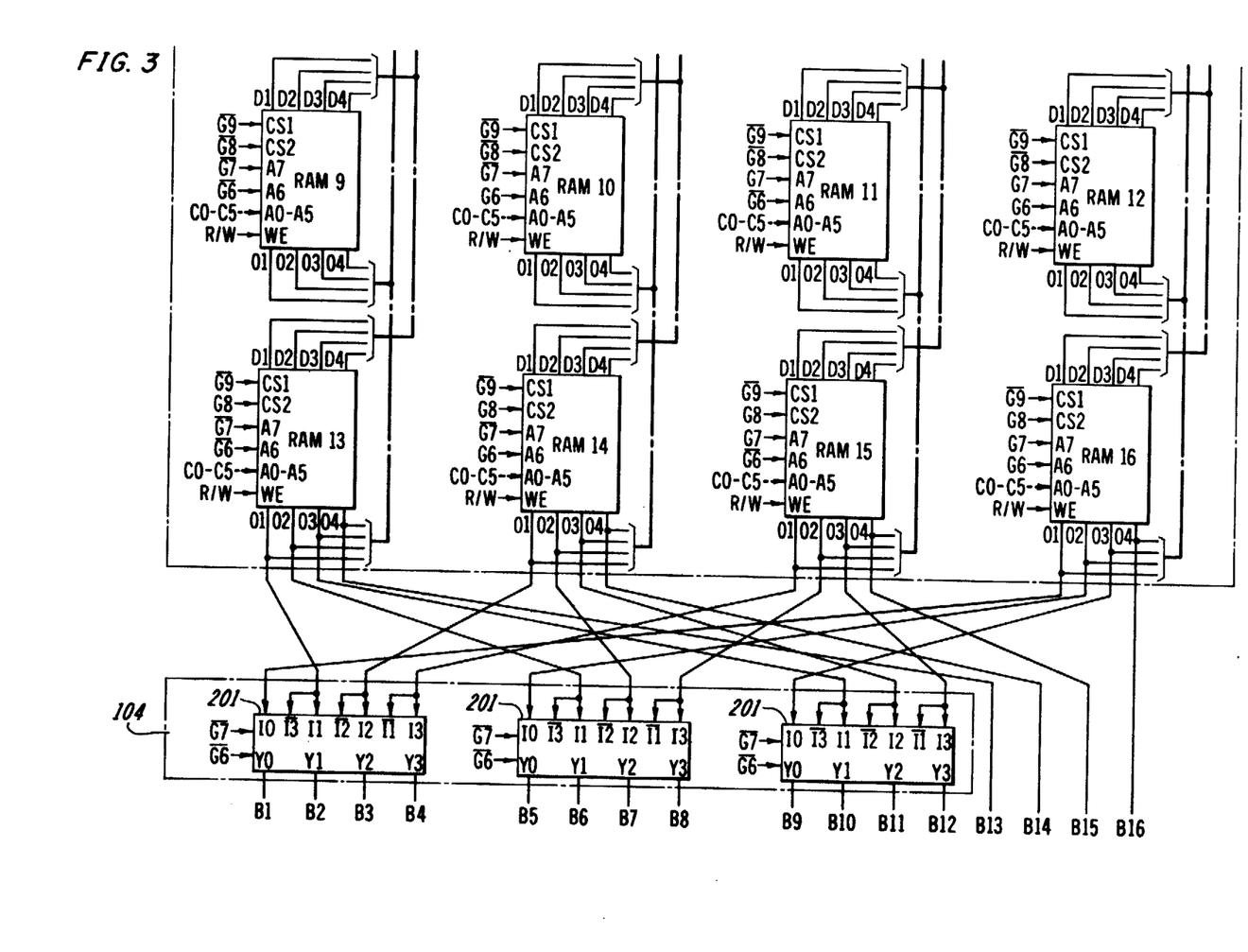

FIGS. 2 and 3 are a schematic diagram of the memory 101, the input rotate circuitry 103, and the output rotate circuitry 104. Each RAM is a word organized random access memory comprising 256 words of 4 bits each and may be a commercially available memory (e.g., Fairchild 93L422). Word selection in a RAM is achieved through the 8 address terminals (A0 through A7). The chip select terminals (CS1 and CS2) allow the memories to be conveniently grouped together to form larger memories as in the present application. A RAM is selected if the signal on the CS1 terminal of the RAM is low and the signal on the CS2 terminal is high. If a RAM is selected, a location therein can be accessed for reading or writing. The electrical state of a RAM write enable terminal WE controls the reading and writing of the RAM. If the WE terminal is in a high state, the data in the addressed location is presented at the data output terminals (01 through 04). If the WE terminal is in a low state, the data present at the input data terminals (D1 through D4) is written into the addressed location.

The 16 RAMs are organized into a 4 by 4 matrix. Each vertical column of the matrix comprises four RAMs which have their input data terminals (D1 through D4) connected in parallel and their output data terminals (01 through 04) connected in parallel. Each column of four RAMs stores four bits of a table entry. A read/write signal from the table user 108 is provided in common to all 16 RAMs via the R/W conductor. Ten address signals define locations within the memory 101. The two signals provided to the CS1 and CS2 terminals of the RAMs serve to select a horizontal row of the memory 101; the two signals provided to the A6 and A7 address terminals serve to define a quadrant within each RAM of a selected row; and the six signals provided to the A0 through A5 address terminals serve to define a location within the quardrant.

The input rotate circuitry 103 and the output rotate circuitry 104 each comprise three identical but independent 4-bit rotate circuits 201. Each 4-bit rotate circuit 201 is a combinational circuit which can be constructed from commercially available 4-bit shifter circuits (e.g., Advanced Micro Devices Am 25S10). Each 4-bit rotate circuit 201 is controlled by a 2-bit signal which coordinates the rotate circuits with the quadrant definitions in the memory 101. The outputs of each 4-bit rotate circuit 201 are equal to the inputs thereto rotated 0, 1, 2, or 3-bit locations in a positive direction corresponding respectively to the control input signals (00), (01), (10), and (11). Rotation in a positive direction means: for a zero-bit rotation, I0 → Y0, I1 → Y1, etc.; for a one-bit rotation, I0 → Y1, I1 → Y2, etc.; for a two-bit rotation, I0 → Y2, I1 → Y3, etc.; and, for a four-bit rotation, I0 → Y3, I1 → Y0, etc. The input rotate circuits each receive control signals from the conductors G6 and G7 and the output rotate circuits each receive control signals from the conductors $\overline{G6}$ and $\overline{G7}$.

Each of the input rotate circuits 201 of the input rotate circuitry 103 receives 4 bits of an entry to be written into the memory 101. The bit provided to the I0 input of each of the input rotate circuits is an access control bit (bits B1, B5, and B9 indicated by asterisks in FIG. 2) and the remaining three bits to each input rotate circuit are data bits. The outputs Y0 through Y3 of the input rotate circuits are spread over the data inputs D1 through D3 of the memory 101. The Y0 outputs from the input rotate circuits are connected respectively to the D1 through D3 data inputs of the first column of the memory; the Y1 outputs from the input rotate circuits are connected respectively to the D1 through D3 data inputs of the second column of the memory; the Y2 outputs from the input rotate circuits are connected respectively to the D1 through D3 data inputs of the third column of the memory; and the Y3 outputs from the input rotate circuits are connected to the D1 through D3 data inputs of the fourth column of the memory. The data bits B13 through B16 are distributed among the D4 data inputs of the first through the fourth columns respectively.

Each of the output rotate circuits 201 of the output rotate circuitry 104 receives 4 bits of an entry read from the memory 101. The output data terminals 01 through 03 of the RAMs are connected to the inputs I0 through I3 of the output rotate circuits such that the 01 data outputs from the RAMs are connected to the output rotate circuit which is associated with data bus bits B1 through B4; the 02 data outputs from the RAMs are connected to the output rotate circuit which is associated with the data bus bits B5 through B8; and the 03 data outputs from the RAMs are connected to the output rotate circuit which is associated with the data bus bits B9 through B12. It should be noted, these connections between the RAMs and the output rotate circuits are not the inverse of the connections between the input rotate circuits and the RAMs but rather the inverse of the connections between the input rotate circuits and the RAMs rotated by one bit location in the same direction as rotation provided by the input and output rotate circuits. That is, the outputs of the first column of the memory are connected to the I1 inputs of the output rotate circuits; the outputs of the second column of the memory are connected to the I2 inputs; the outputs of the third column of the memory are connected to the I3 inputs; and the outputs of the fourth column of the memory are connected to the I0 inputs. These connections provide a rotation by one bit location as information is read from the memory 101. This one bit rotation coupled with the combined rotations of the input and output rotate circuits provides a convenient way to restore data read from the memory to the format required by the data bus 102. It is noted that a rotate by $n$ in an n-bit rotate circuit returns the data bits to their original locations (in the illustrative embodiment $n = 4$). By providing complementary control signals to the input and output rotate circuits, a total rotation of three bit locations is accomplished, i.e., a control signal (00) corresponds to a zero bit rotation while its complementary control signal (11) corresponds to a three bit rotation; (01) corresponds to a one bit rotation while its complement (10) corresponds to a two bit rotation; etc. By providing a one bit rotation via the connections between the memory and the output rotate circuits, a total rotation of four bit locations is accomplished which restores an entry read from the memory 101 to the format required by the data bus 102.

Figure 4:
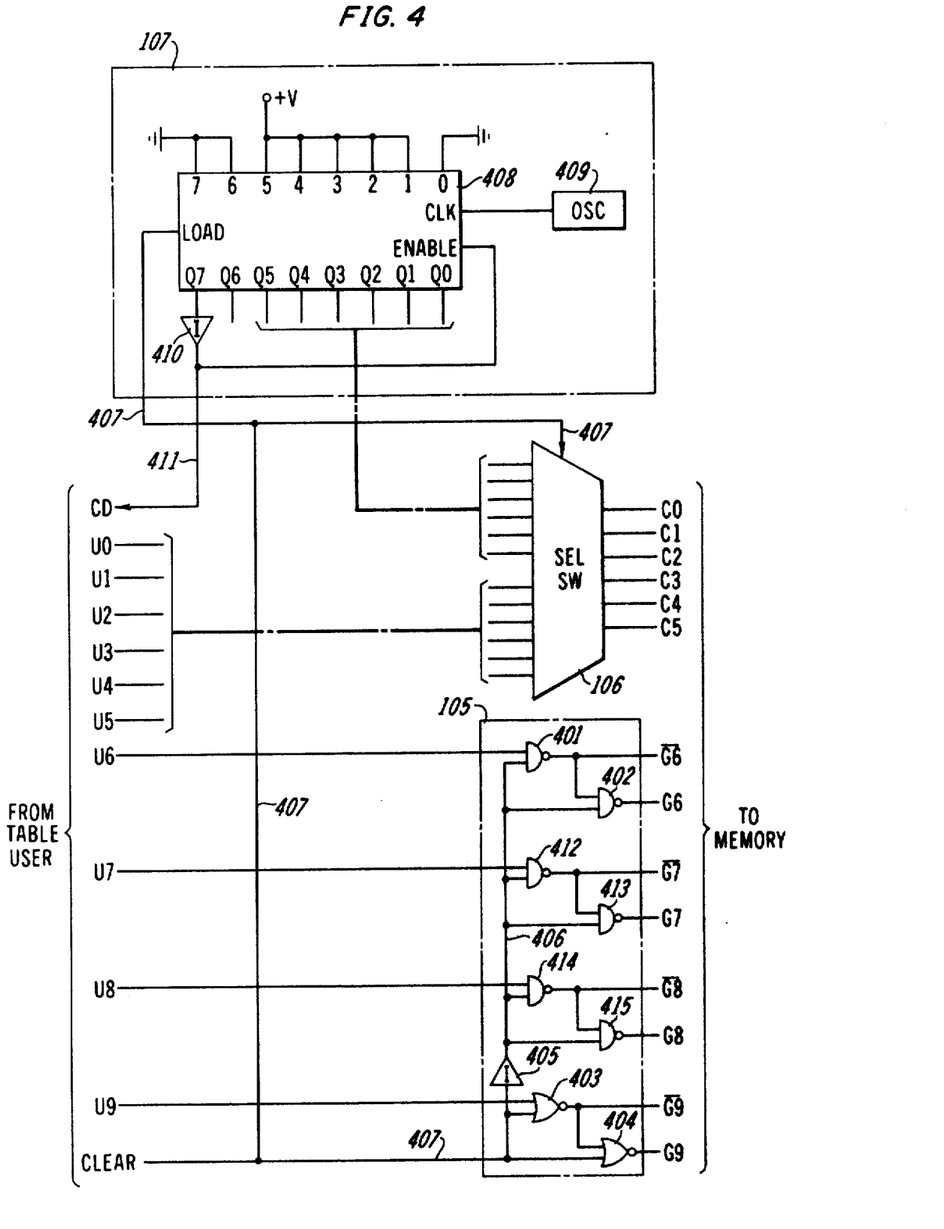
FIG. 4 is a schematic diagram of the gating circuitry and the address generator of FIG. 1.
Figure 5:
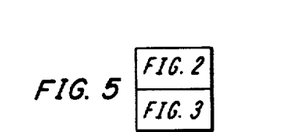
FIG. 5 is a key diagram showing the arrangement of FIGS. 2 and 3.

FIG. 4 is a schematic diagram of the gating circuitry 105 and the address generator 107. The gating circuitry 105 comprises a pair of NAND gates for the memory address bits provided on each of the conductors U6 through U8 and a pair of NOR gates for the memory address bit provided on the conductor U9. Each of the NAND gate pairs 401, 402; 412, 413; and 414, 415 operate similarly, and, accordingly, only the operation of the NAND gates 401 and 402 associated with the conductor U6 will be described. The clear signal from the table user 108 is low when idle and, therefore, due to the inverter 405, the signal on the conductor 406 into the NAND gate pairs is normally high. Accordingly, the signal on the conductor G6 corresponds to the signal on the conductor U6 and the signal on the conductor $\overline{G6}$ corresponds to the inverse of the signal on the conductor U6. If the signal on the clear conductor goes high, the signal on both the conductors G6 and $\overline{G6}$ will be forced high. As previously stated, the NAND gate pairs connected to the conductors U7 and U8 operate similarly. The clear signal, which is low except during a clear request, is provided directly to the NOR gates 403 and 404 via the conductor 407. Accordingly, the signal on the conductor G9 corresponds to the signal on the conductor U9 and the signal on the conductor $\overline{G9}$ corresponds to the inverse of the signal on the conductor U9. If the signal on the clear conductor goes high, the signal on both the conductors G9 and $\overline{G9}$ will be forced low.

The signals which appear on the conductors U8 and U9, serve to select the horizontal row of the memory matrix. Accordingly, the access signals generated on the conductors G8, $\overline{G8}$, G9, and $\overline{G9}$ are connected to the chip select terminals, CS1 and CS2, of the 16 RAMs. As previously described, the signal on the CS1 terminal must be low and the signal on the CS2 terminal must be high for a RAM to be accessed. The access signals are connected to the chip select terminals to perform row selections according to the following states of the signals on the conductors U9 and U8 respectively: state (00) selects the first horizontal row of the memory matrix since the conductors G9 and $\overline{G8}$ are respectively connected to the CS1 and CS2 terminals of the memories comprising the first row; state (01) selects the second row since the conductors G9 and G8 are respectively connected to the CS1 and CS2 terminals of the memories comprising the second row; state (10) selects the third row since the conductors $\overline{G9}$ and $\overline{G8}$ are respectively connected to the CS1 and CS2 terminals of the memories comprising the third row; and state (11) selects the fourth row since the conductors $\overline{G9}$ and G8 are respectively connected to the CS1 and CS2 terminals of the memories comprising the fourth row.

To write into the memory 101, the table user 108 provides address signals on the conductors U0 through U9 and data signals on the data bus 102 which comprises the data conductors B1 through B16 shown in FIGS. 2 and 3. The table user allows a predetermined period of time for these address signals and data signals to stabilize and then lowers the signal on the read/write conductor R/W for a predetermined period of time which writes the data into the location defined by the address. Access signals on the conductors G6 and G7 are provided to the input rotate circuits. Accordingly, the access control bits of an entry to be written into the memory 101 are provided to one of the four columns according to the following address signal states present on the conductors U7 and U6 respectively: for the state (00), the access control bits are provided to the first column; for the state (01), the access control bits are provided to the second column; for the state (10), the access control bits are provided to the third column; and, for the state (11), the access control bits are provided to the fourth column.

If the access signals provided to the RAM address terminals A6 and A7 are both high, the address is within the range of control locations within the RAM. All other combinations of access signals on the RAM address terminals A6 and A7 correspond to data locations. The conductors G6, $\overline{G6}$, G7, and $\overline{G7}$ are selectively connected to the RAM address terminals A6 and A7 to coordinate the RAM quadrant assignments with the input rotate circuits such that access control bits are written into control locations and data bits are written into data locations. The first column of the memory 101 (comprising RAM 1, RAM 5, RAM 9, and RAM 13) has the $\overline{G6}$ and $\overline{G7}$ leads connected to the RAM address terminals A6 and A7 respectively. Thus, for the address signal state (00) of the conductors U7 and U6, respectively, the access control bits are provided to the first column of the memory 101 and the first column RAM of the selected row is accessed at a control location since the signals on the conductors $\overline{G6}$ and $\overline{G7}$ correspond to the complement of the signals on the conductors U6 and U7 respectively, i.e., (11). This coordination is provided in the other columns by connecting the conductors G6 and $\overline{G7}$ to the RAM address terminals A6 and A7, respectively, of the second column of the memory; by connecting the conductors $\overline{G6}$ and G7 to the RAM address terminals A6 and A7, respectively, of the third column of the memory; and by connecting the conductors G6 and G7 to the RAM address terminals A6 and A7, respectively, of the fourth column of the memory. Thus, access control bits are written into the quadrant of each RAM which is defined by high signals on the RAM address terminals A7 and A6. The associated data bits of a table entry are stored in associated locations in the remaining three RAMs of the selected horizontal row.

To read an entry from the memory 101, the table user establishes address signals on the conductors U0 through U9 and maintains the signal on the R/W conductor high. After a predetermined period of time the table entry will be stable on the data bus 102. A horizontal row will have been selected with one of its RAMs accessed at a control location and the other three RAMs accessed at data locations. The data output terminals 01 through 04 from these four RAMs are connected to the inputs I0 through I3 of the output rotate circuits via the slip connection previously described. Since the complements of the address signals present on the conductors U6 and U7 are utilized to control the output rotate circuits, the total effective rotation through the memory and rotate circuits is equal to four thereby returning the output data to the proper format for the data bus 102.

To clear all memory locations which can contain access control bits in the memory 101, the table user provides an all zero data word on the data bus 102 and allows a predetermined period of time for the data to stabilize. The user next provides a low signal on the R/W conductor and allows a predetermined period of time for the signal to stabilize. Finally, the user forces the signal high on the clear conductor. A high signal on the clear conductor provides a low signal to the CS1 terminals of all RAMs and a high signal to the A6, A7, and CS2 terminals of all RAMs. Accordingly, all RAMs are accessed and this access is limited to those locations within the RAMs at which access control bits can be stored. With these locations forcibly accessed, the table user could sequence the memory 101 through all possible signal states of the conductors U0 through U5 and clear all locations within the memory which can contain access control bits. However, sequentially clearing all the control locations is more rapidly accomplished by generating these addresses within the table translator circuit arrangement.

Autonomous clearing is accomplished by the selector switch 106 and the address generator 107 which comprises the 8-stage counter circuit 408 and the high frequency oscillator circuit 409. The clear signal is connected to the load lead of the counter circuit 408 via the lead 407. The clear signal connected to the load terminal is low except during a clear request and if low forces the signal connected to the counter terminals 0 through 7 to be loaded into the counter and reflected at the Q0 through Q7 output terminals. Accordingly, the signal on the Q0 terminal is low, the signals on the Q1 through Q5 terminals are high, and the signals on the Q6 and Q7 terminals are low. The inverter 410 provides a high enable signal to the enable terminal of the counter circuit 408 as long as the signal on the Q7 terminal is low. However, the counter circuit remains in the state determined by the load terminal until the signal to the load terminal goes high. The clear signal is also connected to the selector switch 106 via the conductor 407. If the clear signal goes high, the Q0 through Q5 output terminals of the counter circuit 408 are connected to the address terminals A0 through A5 of all RAMs of the memory 101. The signal on the clear conductor going high removes the load signal from the counter circuit 408 and allows the counter circuit to start counting output pulses from the oscillator 409. The signals on the output terminals of the counter circuit 408 are two counts below all zeroes when the counter circuit starts counting to ensure that all locations in the RAMs which can contain access control bits are accessed during the clear sequence. After two pulses from the oscillator are counted, the Q6 terminal goes high and the Q0 through Q5 terminals go low defining the first address in the block of control locations. The signals on the terminals Q0 through Q5 are sequenced through all six bit binary number states and eventually reach the all "1" state. The next pulse from the oscillator causes the Q0 through Q6 terminals to go low and the Q7 terminal to go high. A high signal on the Q7 terminal disables the counter circuit 408 via the inverter circuit 410 and also signals the table user via the CD conductor that the clear of the table memory access control bit locations has been accomplished.

What is claimed is:

1. In combination:
    a plurality of random access word organized memories wherein the word locations of each memory are separated into control and data locations defined by corresponding ranges of memory addresses;
    a source of data words which each comprise one or more access control bits and associated data in a defined format, each data word being longer than a word length in one of said memories;
    means connected to said memories for accessing a control location of at least one of said memories and a data location of at least an additional one of said memories;
    means connected to said source of data words and to said memories and coordinated with said accessing means for distributing the individual bits of a data word to said memories such that said access control bits are provided to memories having access control locations accessed and said associated data are provided to said additional memories having data locations accessed;
    means connected to said accessing means and to said memories and coordinated with said accessing means for associating the individual bits of the locations accessed in said memories into an output data word having said defined format; and
    said accessing means including means for simultaneously accessing said plurality of memories at addresses within said control locations thereof whereby the time required to access all control bits stored in said memories is reduced by a factor equal to the number of said plurality of memories as compared with sequentially accessing then.

2. The combination in accordance with claim 1 which further comprises means connected to said accessing means for generating in sequence the memory access addresses which correspond to said control locations.

3. The combination in accordance with claim 1 wherein:
    said distributing means comprises input rotate circuitry for receiving said data words and distributing the individual bits of said data words among said memories; and
    said associating means comprises output rotate circuitry for associating control bits and associated data bits read from said memories into said defined format.

4. The combination in accordance with claim 1 which further comprises a source of control signals and a source of address signals which address signals define locations within said plurality of memories; and
    wherein said means for simultaneously accessing said plurality of memories comprises gating circuitry connected to said source of control signals and to said source of address signals and responsive to said address signals for generating memory access signals which are applied to said plurality of memories and further responsive to said control signals for forcing said memory access signals into predefined states independently of said address signals.

5. In combination:
    a plurality of random access word organized memories wherein the word locations of each memory are separated into control and data locations defined by corresponding ranges of memory addresses;
    a source of control and address signals, which address signals define locations within said plurality of memories;
    a source of data words, which words each comprise one or more access control bits and associated data bits all arranged in a defined format;
    means connected to said memories and to said source of control and address signals and responsive to said control signals and said address signals for generating memory access signals for reading and writing said memories and comprising means for limiting memory access to allow access only to said control locations and for simultaneously accessing one of said control locations in all memories whereby all control locations are accessed in a reduced time period as compared with sequentially accessing them;
    means connected to said source of data words, to said memories, and to said means for generating memory access signals and controlled by said means for generating memory access signals for distributing the individual bits of said data words to said memories such that said access control bits are only written into said control locations and said associated data bits are written into said data locations; and
    means connected to said memories and to said means for generating memory access signals and coordinated with said means for generating memory access signals for associating the contents of accessed memory locations into an output data word having said defined format.

6. The combination in accordance with claim 5 wherein said distributing means and said associating means each comprise at least one rotate circuit, and said means for limiting memory access comprises gating circuitry for forcing said memory access signals to states defining only control locations.

7. In combination:
a plurality of random access word organized memories each of which comprises input data terminals, output data terminals, input address terminals, and at least one control terminal;
a source of data words which words each comprise one or more access control bits and associated data;
a plurality of address signal conductors for conducting address signals and comprising a first group of conductors and a second group of conductors;
control signal conductors equal in number to the number of control terminals of each memory of said plurality and connected to said control terminals such that corresponding control terminals of all the memories of said plurality are connected to the same control signal conductors;
first generating means connected to said first group of address signal conductors and responsive to address signals thereon for generating access signals;
first connecting means for connecting said access signals to corresponding ones of said input address terminals in an ordered plan;
second connecting means for connecting said second group of address signal conductors to the remaining ones of said input address terminals;
distributing means connected to said first generating means and to said source of data words and responsive to at least one of said access signals for distributing individual bits of said data words among said input data terminals such that access control bits may be written into selected portions of all memories of said plurality and data bits may be written into the remaining portions of all of said members in an ordered plan;
associating means connected to said first generating means and responsive to at least one of said access signals for associating signals on said output data leads into a defined format; and
a source of clear signals connected to said first generating means, said first generating means comprising means responsive to said clear signals for forcing said access signals into predetermined states whereby an access control bit in each of said memories can be changed simultaneously.

8. The combination in accordance with claim 7 wherein said first generating means comprises gating circuitry comprising an inverter having its input connected to said source of clear signals, a pair of NAND gates for each of predetermined ones of said first group of address signal conductors, and a pair of NOR gates for the remaining ones of said first group of address signal conductors; said NAND gate pairs being interconnected identically such that a first input of the first NAND gate of each pair is connected to an associated address signal conductor, the output of said first NAND gate is connected to a first input of the second NAND gate of each pair, the output of said inverter is connected to a second input of said first and second NAND gates of each pair, and the outputs of all of said first and second NAND gates are connected to said first connecting means; and said NOR gate pairs being interconnected identically such that a first input of the first NOR gate of each pair is connected to an associated address signal conductor, the output of said first NOR gate is connected to a first input of the second NOR gate of each pair, said source of clear signals is connected to a second input of said first and second NOR gates of each pair, and the outputs of all of said first and second NOR gates are connected to said first connecting means.

9. The combination in accordance with claim 7 wherein said distributing means and said associating means each comprise at least one rotate circuit.

10. The combination in accordance with claim 7 further comprising:
third connecting means for connecting said source of clear signals to said second connecting means;
second generating means for sequentially generating on output terminals thereof signals corresponding to all possible states of said output terminals; and
wherein said second connecting means comprises a selector switch connected to said second generating means and responsive to said clear signals for alternatively connecting said second group of address signal conductors and said output terminals of said second generating means to said remaining ones of said input address terminals.

11. The combination in accordance with claim 10 wherein said second generating means comprises an oscillator circuit for generating periodic pulses and a counter circuit for counting said periodic pulses.

12. In combination:
a plurality of random access word organized memories wherein the word locations of each memory are separated into control and data locations defined by corresponding ranges of memory addresses;
a source of data words each of which comprises one or more access control bits and associated data;
means for simultaneously accessing a control location in at least one of said plurality of memories and a data location in at least one additional memory of said plurality;
distributing means connected to said source of data words and to said memories and coordinated with said accessing means for distributing control bits to the memory wherein said control location is accessed and data bits to said additional memories wherein said data locations are accessed;
associating means connected to said accessing means and to said memories and coordinated with said accessing means for associating control bits and data bits of the accessed memories into a defined format; and
said accessing means including means for simultaneously clearing corresponding control bit locations in a plurality of said memories whereby the time required to clear all access control bits is reduced by a factor equal to the number of said plurality of memories as compared with sequentially clearing them.

13. The combination in accordance with claim 12 further comprising means connected to said accessing means for generating in sequence the memory addresses defining the control locations.

14. The combination in accordance with claim 13 wherein said generating means comprises:

a high frequency oscillator and a counting circuit for counting pulses from said high frequency oscillator.

15. A random access memory system for use with data words each of which comprises at least one access control bit and associated data bits, said memory comprising:
a plurality of individual memories wherein the word locations of each memory are separated into control locations and data locations defined by corresponding ranges of memory addresses;
input rotate circuitry connected to said plurality of memories for distributing said access control bits and said associated data bits among said memories;
output rotate circuitry connected to said plurality of memories for receiving access control bits and associated data bits read from said memories and associating them into a defined format; and
gating circuitry connected to said memories and to said input and output rotate circuitry for coordinating said memories with said input rotate circuitry for writing words into said memories such that said access control bits are written into said control locations of said memories and said associated data bits are written into said data locations and for coordinating said memories with said output rotate circuitry for reading words from said memories such that said control bits and said data bits appear in a defined format.

16. A random access memory system in accordance with claim 15 which further comprises:
an oscillator circuit;
a counter circuit connected to said oscillator circuit for counting pulses therefrom; and
a selector switch for connecting said counter circuit to said memories.

17. A random access memory system in accordance with claim 15 wherein:
said input rotate circuitry comprises a plurality of individual input rotate circuits each of which is capable of rotating input data between input terminals thereof and output terminals thereof by zero to $n$ bit locations in a positive direction of rotation, said input rotate circuits receiving data words on said input terminals and having their output terminals connected to said memories;
said output rotate circuitry comprises a plurality of individual output rotate circuits each of which is capable of rotating input data between input terminals thereof and output terminals thereof by zero to $n$ bit locations in said positive direction said output rotate circuits having their input terminals connected to said memories such that a rotation of one bit position in said positive direction is effected by said connection and said output rotate circuits provide at their output terminals data words in a defined format when said memories are accessed; and
said gating circuitry controls said input and output rotate circuitry such that if said input rotate circuits provide a rotation of $x$ bit locations ($x \leq n$) upon writing a data word into a location in said memories, said output rotate circuits provide a rotation of $n - x$ bit locations upon reading a data word from said location in said memories.

* * * * *